United States Patent [19]

Hahn

[11] Patent Number: 4,945,425
[45] Date of Patent: Jul. 31, 1990

[54] METHOD AND AN APPARATUS FOR CONTROLLING A VIDEO CASSETTE RECORDER

[75] Inventor: Mark C. Hahn, Los Gatos, Calif.

[73] Assignee: Videonics Incorporated, Campbell, Calif.

[21] Appl. No.: 32,371

[22] Filed: Mar. 30, 1987

[51] Int. Cl.⁵ .............................................. G11B 5/86
[52] U.S. Cl. ..................................... 360/15; 360/14.3; 358/311; 369/83
[58] Field of Search ........................ 360/14.1–14.3, 360/15; 369/83, 84; 358/311

[56] References Cited

U.S. PATENT DOCUMENTS

| | | | |
|---|---|---|---|
| 4,410,917 | 10/1983 | Newdoll et al. | 369/84 X |
| 4,507,691 | 3/1983 | Ishiguro et al. | 360/14.3 |
| 4,587,575 | 5/1986 | Odagiri et al. | 369/84 X |
| 4,628,370 | 12/1986 | Fukuoka | 360/15 |
| 4,635,136 | 1/1987 | Ciampa et al. | 360/14.1 X |
| 4,685,003 | 8/1987 | Westlake | 360/14.1 |
| 4,703,465 | 10/1987 | Parker | 360/15 X |
| 4,717,971 | 1/1988 | Sawyer | 360/14.1 X |
| 4,819,087 | 4/1989 | Takeuchi et al. | 360/14.3 |

FOREIGN PATENT DOCUMENTS

| | | | |
|---|---|---|---|
| 56-165960 | 12/1981 | Japan | 360/14.1 |
| 58-164071 | 9/1983 | Japan | 360/14.1 |
| 61-48187 | 3/1986 | Japan | 369/83 |

OTHER PUBLICATIONS

Automatic Editing—Control Data—Collection System.

*Primary Examiner*—Aristotelis M. Psitos
*Attorney, Agent, or Firm*—Limbach, Limbach & Sutton

[57] ABSTRACT

A method and an apparatus for assembling, editing and producing a production video cassette from a source video cassette without timing signal recorded thereon is disclosed. The source video cassette is initially dubbed onto a dub cassette with timing signals recorded thereon. The dub cassette is edited and assembled, using the timing signals recorded thereon. Using the sync count of the original source cassette, the timing signal of the desired video scence is correlated with the sync field count of the source video cassette. A production cassette is made from the source cassette without the timing signal. The present invention also discloses assembling, editing and viewing a video cassette having timing signals associate recorded thereon. The cassette recorder is operated on based upon the performance characteristics which were predetermined. The assembling and editing of each of the video cassettes is done to form the video production. The video production is then viewed by activating the search and playback capability of the video cassette recorder based upon the performance characteristics of the cassette recorder. Finally, an audio/video controller system is disclosed where a plurality of electrically connectable units is in communication with one another based upon a digital control bus controlling an analog video bus and an analog audio bus.

12 Claims, 5 Drawing Sheets

Microfiche Appendix Included
(3 Microfiche, 231 Pages)

METHOD AND AN APPARATUS FOR CONTROLLING A VIDEO CASSETTE RECORDER

This application is submitted with a microfiche appendix (Exhibits A, B, C) consisting of three (3) microfiches and 231 frames.

TECHNICAL FIELD

The present invention relates to a method and an apparatus for controlling a video cassette recorder or VCR and, more particularly, to a method and an apparatus for controlling a VCR to assemble, edit and produce a production video cassette. The present invention also relates to a method and an apparatus for controlling the VCR to assemble, edit and view a video production from one or more source video cassettes. Finally, the present invention relates to an audio/video bus control system.

BACKGROUND OF THE INVENTION

Video cassette recorders or VCR's are well-known in the art. VCR's have gained wide acceptance in the consumer market place where video information is recorded on magnetic video tape stored in a video cassette. Further, with a camera attached to a VCR, home movie recording is possible. Finally, the integration of a VCR with a camera to produce what is commonly called a "Camcorder" has made possible the recording of home movies on magnetic tape in a true portable system.

With the proliferation of cameras attached to VCR's and the gaining of popularity for camcorders, it becomes increasingly desirable to edit the voluminous amount of home movies recorded on video cassettes. Heretofore, no apparatus has been provided to assemble, edit and produce a production video cassette based upon source cassettes that do not have timing signals, and to assemble, edit and view video production from one or more source video cassettes.

SUMMARY OF THE INVENTION

DETAILED DESCRIPTION OF THE DRAWINGS

Figure 1:
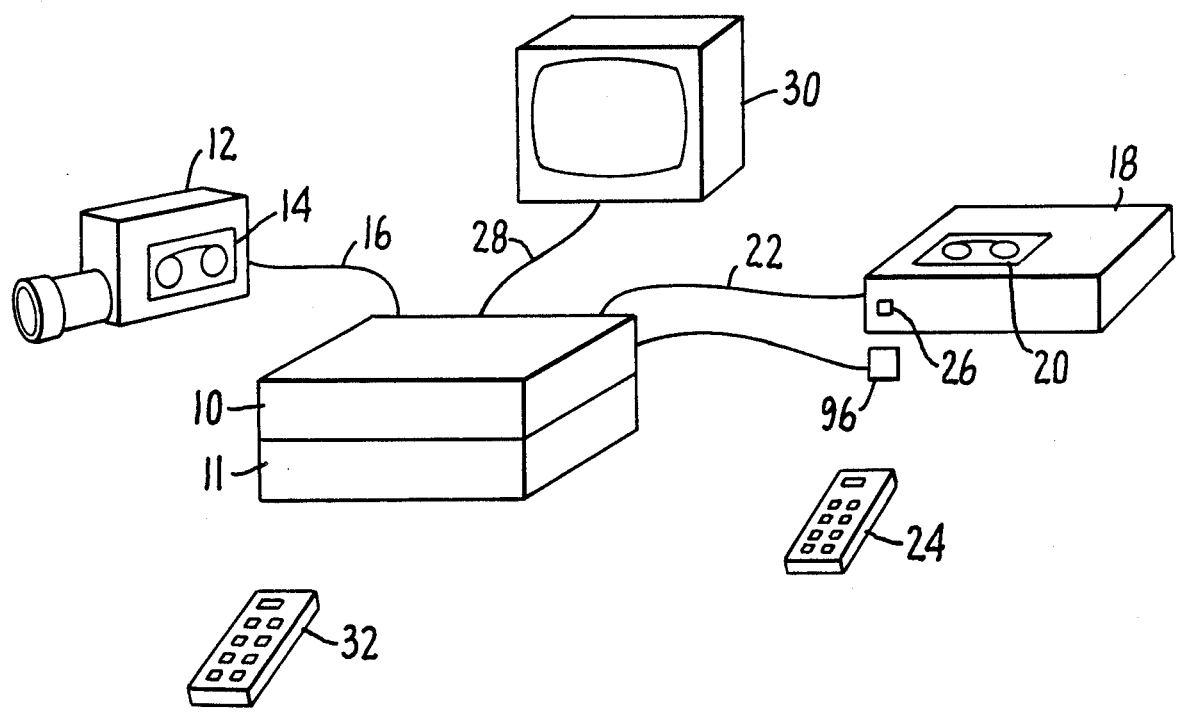
FIG. 1 is a perspective view of the apparatus of the present invention connected to a camcorder, a VCR and a TV monitor.

Referring to FIG. 1, there is shown a perspective view of an apparatus 10 of the present invention. The apparatus 10 is connected to a camcorder 12 which has a source video cassette 14 loaded therein. The source video cassette 14 has source video information recorded thereon and is transferred to the apparatus 10 via first wire 16, typically coax wire. The apparatus 10 is also connected via a second wire 22 to a second cassette player 18 which has a second video cassette 20 loaded therein. The second VCR 18 is of the type which has remote control capability, as shown by the remote controller 24. The remote controller 24 is of the type which emits infrared radiation and is received by the infrared sensor 26 in the second cassette player 18. The apparatus 10 is also connected via a third cable 28 to a TV monitor 30 which receives the video signals from the apparatus 10 for display. Finally, the apparatus 10 is connected by a bus (shown and discussed in greater detail hereinafter) to a peripheral apparatus 11. The apparatus 10 is controllable by a remote controller 32.

Figure 2:
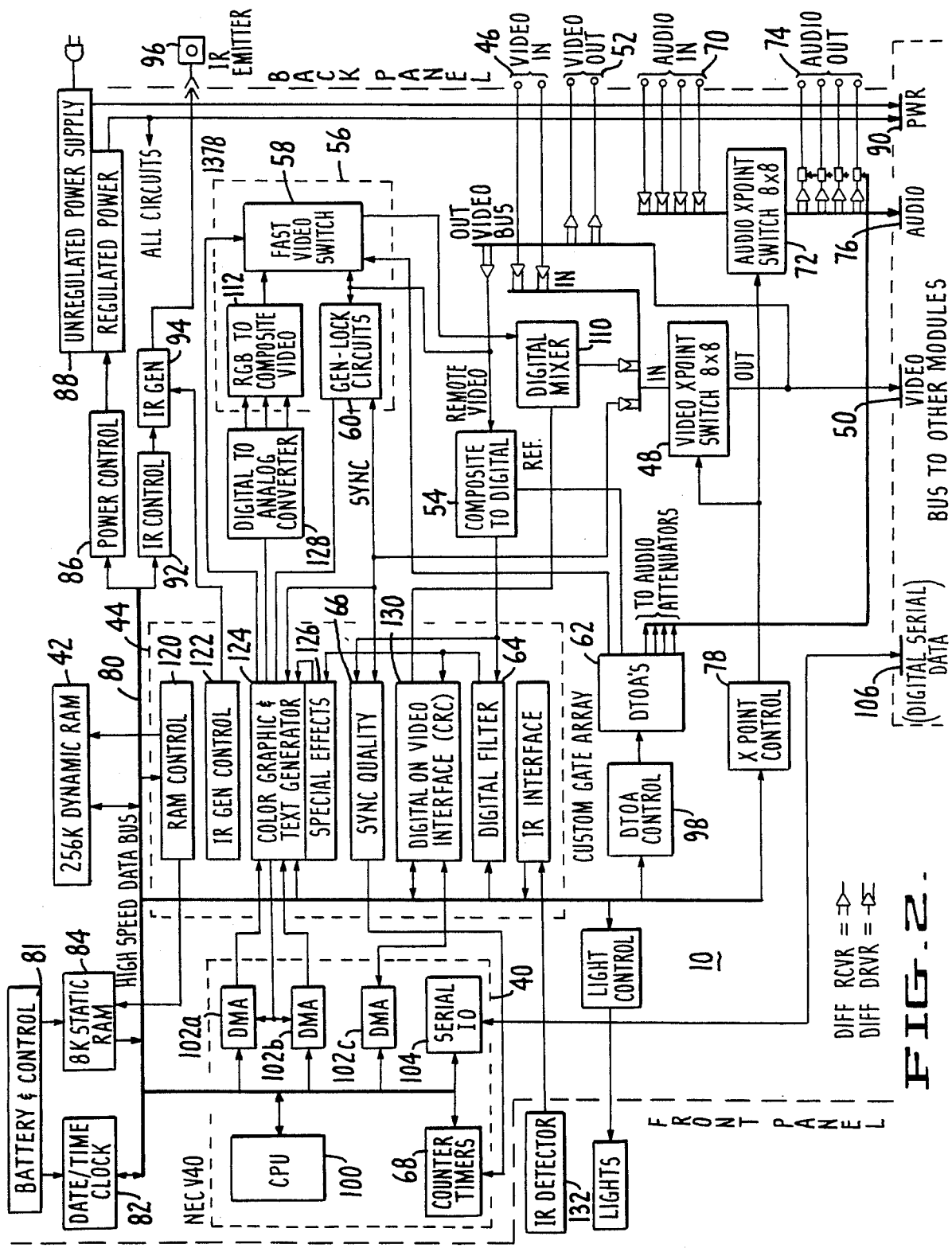
FIG. 2 is a schematic block circuit diagram of the apparatus of the present invention.

Referring to FIG. 2, there is shown, in schematic block diagram form, the apparatus 10 of the present invention. The apparatus 10 comprises a plurality of input video terminals 46 which receive input video signals. The input video signals are directed to a video cross-point switch 48. The output of the video cross-point switch 48 is four pairs of video signals which is provided to a video bus 50 (to be discussed hereinafter), as well as to a plurality of output video terminals 52. The video cross-point switch 48 is a well-known CMOS switch.

The output of the video cross-point switch 48 is also directed to a composite-to-digital circuit 54. The output of the composite-to-digital circuit 54 is a digital signal and is supplied to a custom gate array 44. The video signal from the video cross-point matrix 48 is also directed to a video processor 56 which is a Motorola Part 1378. Within the Motorola 1378, the video signal is directed to a fast video switch 58 and to a gen lock circuit 60. The Motorola 1378 also contains an RGB-to-composite video control circuit 112.

Figure 7:
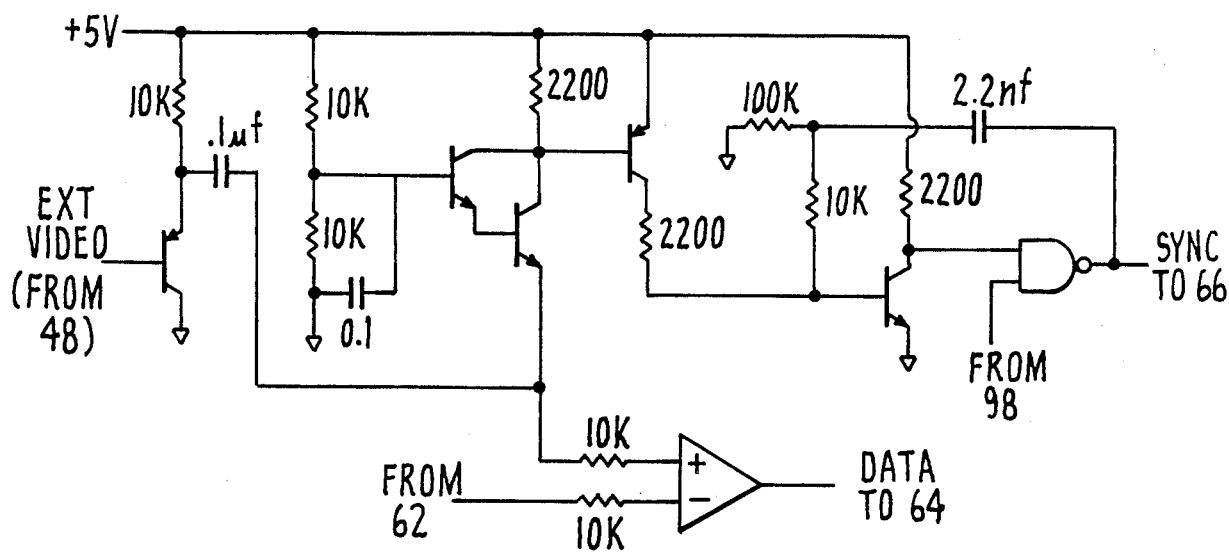
FIG. 7 is a schematic circuit diagram of the composite-to-digital circuit portion of the apparatus of the present invention.

The composite-to-digital circuit 54 is shown in greater detail in FIG. 7. The circuit 54 is a comparator which receives the input video signal and compares it to a reference signal, which is supplied from the output of the digital-to-analog converter 62 and extracts digital information, such as timing signal, special effects (messages), and sync signals from each video field. The sync signals include a vertical sync signal and a plurality of horizontal sync signals. The composite-to-digital circuit produces a digital signal which is supplied to the digital filter 64 portion of the custom gate array 44. In addition, the digital signal is analyzed by the sync quality circuit 66 of the custom gate array 44. From the sync quality circuit 66, an output signal is sent to a microprocessor 40.

The microprocessor 40 is an NEC V40 microprocessor and is in communication with a data bus 80. The data bus 80 is connected, in part, to the custom gate array 44 and to a 256K RAM memory 42.

The apparatus 10 also has a plurality of audio input terminals 70. The input audio signals are received by an audio cross-point switch 72 whose output is provided to a plurality of output audio terminals 74, as well as being provided to the audio bus 76. The audio cross-point switch 72 is also a well-known CMOS switch. Both the video cross-point switch 48 and the audio cross-point switch 72 are controlled by the cross-point control register 78 which is in communication with the data bus 80.

The microprocessor 40 is also in communication, via the data bus 80, with a date/time clock 82 and 8K bytes of static RAM 84. The data bus 80 is also supplied to a power control register 86 which controls the power supply 88 which is distributed to all parts of the apparatus 10. In addition, the power lines are supplied to the power bus 90. The date/time clock 82 and the 8K RAM 84 are supported by battery back-up 81. Thus, the 8K RAM 84 functions as a non-volatile memory. The memory 84 contains software for operation of the apparatus 10. A copy of that software is attached as Exhibit B.

The data bus 80 is also in communication with an IR control register 92 which controls the generation of infrared energy by the IR generator circuit 94, which is then connected to the IR emitter 96. Finally, the data bus 80 is in communication with a digital-to-analog control register 98, which controls the digital-to-analog converter 62. The output of the digital-to-analog converter 62 is supplied to the fast video switch 58, as well as to the composite-to-digital circuit 54. In addition, the output of the converter 62 is supplied to the audio attenuator which is supplied to the plurality of audio output terminals 74.

Within the microprocessor 40, as previously described, is a counter timer 68. In addition, there is a CPU 100 which is in communication with the data bus 80. Further, a plurality of DMA circuits 102 (a-c) are provided and are in communication with the high-speed data bus 80. Finally, a serial I/0 port circuit 104 is provided and is in communication with the data bus 80. The I/0 port circuit 104 provides a plurality of control lines to the digital control bus 106.

Within the Motorola 1378 video processor 56, as previously described, is a fast video switch 58 which receives analog signals (from the input video terminal and from the digital-to-analog converter 62) and provides an output analog signal to a digital mixer 10. Another input to the digital mixer 110 is from the custom gate array 44. The output of the digital mixer 110 is provided to the input of the video crosspoint switch 48. The digital mixer 110 places digital information on the analog video signal.

The custom gate array 44 is a Motorola gate array Part No. HCA62A25, customized to the applicant's specifications. As it is well-known in the art, a customized gate array is developed from, typically, software supplied by the customer. A copy of that software or net list used to make the customized gate array 44 is attached herewith as Exhibit A. Within the customized gate array 44 are the following functions. A RAM control register 120 which controls the 256 dynamic RAM memory 42 and the 8K static RAM 84. An IR infrared generator control circuit 122 controls the IR generator circuit 94 which causes the IR emitter 96 to generate Infrared Radiation. The IR emitter 96 is placed proximate to the infrared sensor 26 of the second VCR 18 and is the means by which the apparatus 10 controls the operation of the second VCR 18.

The gate array 44 also comprises a color graphic and text generator 124 which receives digital signals from the DMA 102 (A and B) and provides digital signals to the DMA 102 (A and B), respectively. The color graphic and text generator 124 also receives a digital signal from the gen lock circuit 60 and digital signal from the special effects circuit 126. Finally, the color graphic and text generator 124 provides sync digital signals to the gen lock circuit 60, as well as to the video cross-point switch 48. The other digital signals from the color graphic and text generator 124 are provided to the fast video switch 58, as well as to a second digital-to-analog converter 128 whose analog output is provided to the RGB-to-composite video control circuit 112.

As previously stated, the sync quality circuit 56 receives the signal from the composite-to-digital circuit 54 and provides an output to the counter timer 68. A digital-on-video interface circuit 130 generates a CRC or cyclical redundancy check and is provided to the special effect 126, as well as to the digital mixer 110. The digital-on-video interface circuit 130 also receives digital signal from the DMA circuit 102C. As previously stated, a digital filter 64 receives the signal from the composite-to-digital circuit 54 and provides an output to the special effect circuit 126. Finally, an IR interface circuit receives the signal from the IR detector 132 and provides a digital signal to the high-speed data bus 80. The IR detector 132 is located in the front of the apparatus 10 and is adapted to receive IR signals from the remote controller 32.

The apparatus 10 of the present invention is connected to a camcorder 12 via one of the plurality of input video terminals 46 and is adapted to receive input video signals therefrom. Another source of input video signal to the input video terminal 46 is from the second VCR 18. One of the outputs of the plurality of output video terminals 52 is supplied to the TV monitor 30. The other output video terminal 52 is connected to the second VCR 18. The input and output audio signals from the second VCR 18 are connected to one of the input audio terminals 70 and one of the output audio terminals 74, respectively.

In the operation of the apparatus 10 of the present invention, after the camcorder 12, the monitor 30, and the second VCR 18 have been connected thereto, a video cassette 20 containing software is first placed in the second VCR 18 for playback. The user is instructed to rewind the video cassette 20 containing the software and to activate the second VCR 18 for playback. That software is transmitted over the second wire 22 and is received at one of the video input terminals 46 which is passed through the video crosspoint switch 48 and is then supplied to the composite-to-digital circuit 54 which extracts the digital signal. Thereafter, the digital signal is supplied to the digital filter 64 and is supplied to the high-speed data bus 80. The software is then loaded into the 256K dynamic RAM memory 42. The software is then executed by the microprocessor 40. A copy of that software is attached as Exhibit C.

With the software data tape still in the second VCR 18, the microprocessor 40 performs a number of tasks which is designed for the apparatus 10 to learn the operating characteristics of the second VCR 18. Since the second VCR 18 can be from different manufacturers and such VCR would have different operating characteristics, it is important that the apparatus 10 first determine the operating characteristics of the second VCR 18. The operating characteristics of the second VCR 18 include information such as the speed of rewind; the speed of fast forward; the amount of rewind error, i.e., the tolerance of rewind; the infrared signals which must be generated by the apparatus 10 at the IR emitter 96 in order for the second VCR 18 to respond to commands such as fast forward, rewind, play, stop and record. All of this operating characteristics information is then stored in the memory 42.

After the apparatus 10 has exercised the second VCR 18 through its operating characteristics and has determined the data for the operating characteristics of the second VCR 18, the user is instructed to load a first blank video cassette into the second VCR 18. This is the data tape onto which the apparatus 10 would write and store the operating characteristics which it has just determined and other data that the apparatus 10 generates.

Creation A Tape Library

To create a tape library, the user is instructed to place the original source video cassette 14 into the camcorder 12. The user is also instructed to remove the data tape from the second VCR 18 and to insert another blank cassette therein. The user is further instructed to rewind the video cassette 14 in the camcorder 12 to the starting position and to commence the playback of video information stored thereon.

The apparatus 10 receives the video information stored on the video cassette 14. The video information stored on the video cassette 14 has the conventional video format. In the United States, that is in accordance with the NTSC standard; i.e., an image is comprised of a plurality of frames with each frame having two interleaved video fields. Each field is preceded by a vertical video sync signal, followed by a plurality of horizontal scan lines with each scan line preceded by a horizontal sync signal. Further, the video information from the video cassette 14 having previously been recorded by the camcorder 12, does not contain any timing signal associated therewith.

The apparatus 10 receives each field of video information from the camcorder 12. Each field is then divided into 24 bits by 24 bits for a total of 576 bits by the composite-to-digital circuit 54. Thus, each field is represented by 576 bits and is stored. The processor 40 then compares the current field of 576 bits to the previously stored 576 bits and counts the number of bits which have changed. This denotes a change in the video information from the current field to the previous field. Thirty consecutive field changes are then recorded. Although each field change can have a maximum possible value of 576 (the screen changed from all white to all black, or vice versa), only 1 byte (8 bits) representative of 256 possible values is used to store a field change. The thirty field changes are stored as 30 bytes. This information is stored in the memory 42. The processor 40 sequentially receives each new field of video information and updates the number that represents the 30 changes of fields. Within 600 fields or 10 seconds (where each field is 1/60 sec.), the 30 fields that have the most amount of change, i.e., the 30 fields where the changes are greatest is then stored. This signifies the beginning of the video information on the video cassette 14.

The video signals received from the video cassette 14 are received by the input terminal 46 through the video cross-point switch 48 and is sent to the composite-to-digital circuit 54 and passed to the digital filter circuit 64 of the custom gate array 44.

Figure 5:
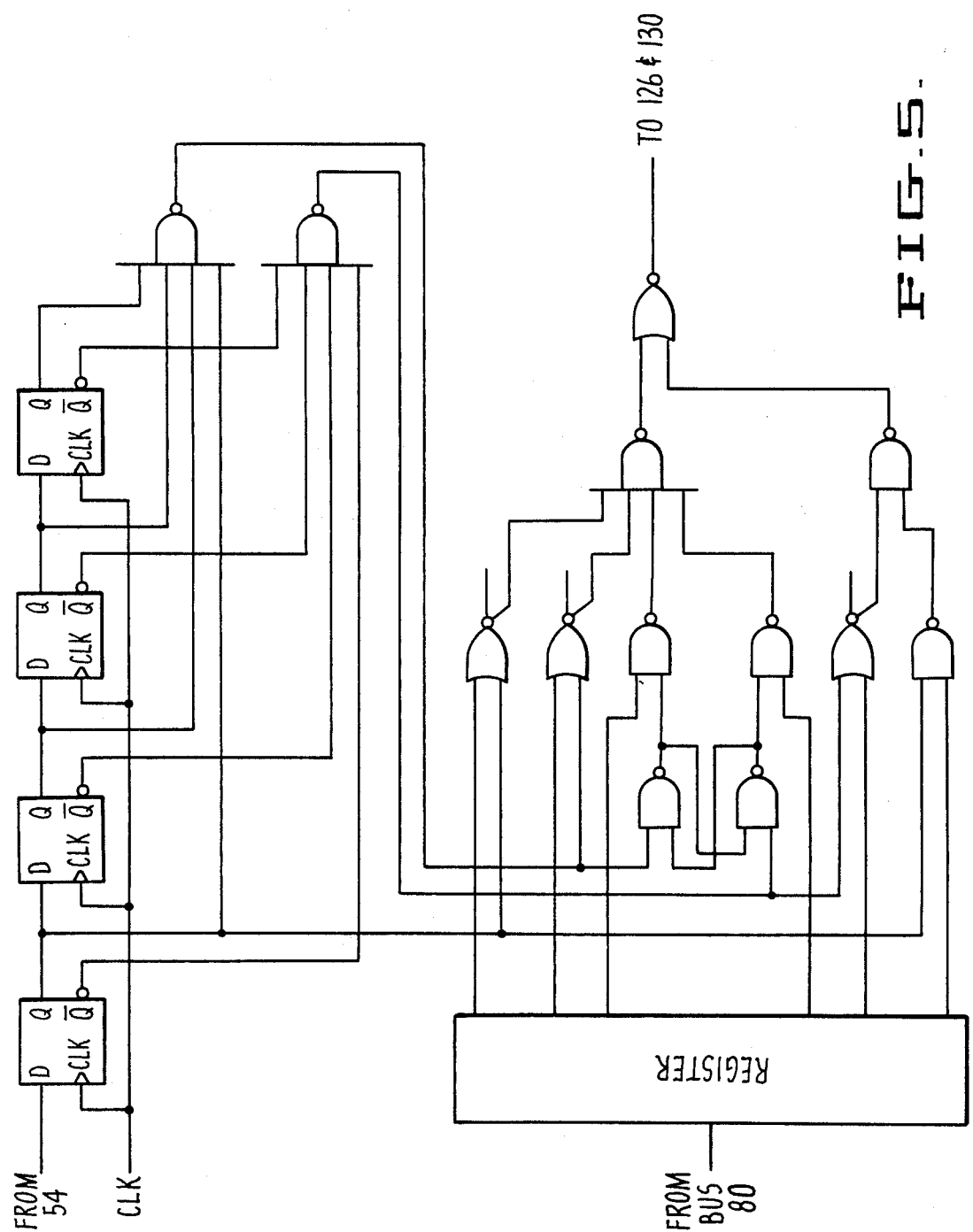
FIG. 5 is a schematic circuit diagram of the digital filter circuit portion of the apparatus of the present invention.

The function of the digital filter 64 is to reduce errors generated by noise. A circuit diagram of the digital filter 64 is shown in FIG. 5.

Figure 6:
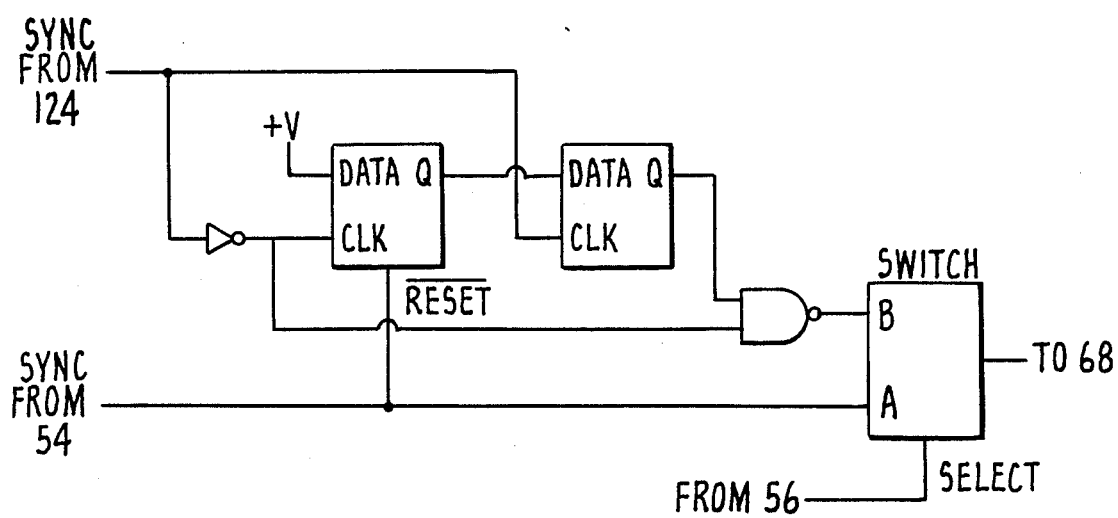
FIG. 6 is a schematic circuit diagram of the sync quality circuit portion of the apparatus of the present invention.

The sync signals (both the vertical sync signal as well as the plurality of horizontal sync signals in each field) from the composite-to-digital circuit 54 are also sent to the sync quality circuit 66. A circuit diagram of the sync quality circuit 66 is shown in FIG. 6. The sync quality circuit 66 also receives sync signals (both the vertical sync signal as well as the plurality of horizontal sync signals in each field) generated by the color graphic text generator 124. The function of the sync quality circuit 66 is to compare the external sync signals (from the composite-to-digital circuit 66, which is from the video input terminal) to the internal sync signals (from the color graphic text generator 124). If the external sync signal is of poor quality (by poor quality it is meant that the external sync signal does not exist within the time period to trigger the comparison), then an interrupt is sent to the counter timer 68 of the microprocessor 40. After each field of time as determined by the internal video vertical sync, the microcomputer 40 reads out the counter timer 68. If the count in the counter timer 68 exceeds a threshold as determined by an algorithm in the software, then a video field of poor quality is deemed to have occurred. The threshold can be a simple fixed number such that if the count in the counter timer 68 exceeds that number, then a field of poor quality has occurred. Alternatively, the threshold can be a more complex algorithm, which is self-adapting, i.e., change upon learning, such as that in the software. The count in the counter timer 68 is then reset after each field.

If a video field of poor quality has occurred, then the processor 40 continues to count video fields, using the internally generated video sync signals, until an external video field having "good" video sync signals is detected. At that point, the processor 40 records the video field number (as determined by the count based upon the internal video sync signal) of the first good field which immediately followed the loss of sync signals. A first record is constructed in the memory 42 which comprises a list of the field count of the video field immediately after the loss of sync quality.

During this time, the signal received at the input video terminal 46 is also sent to an output video terminal 52 to be recorded on the second VCR 18. Immediately after each video vertical sync signal is recorded on the second VCR 18 but prior to the recordation of the video information thereon, a timing signal is recorded on the video cassette 20. In the NTSC notation, the video vertical retrace interval has a duration lasting approximately the first 14 horizontal lines. During the time of the horizontal scan from lines 15 to 20, the timing signal comprising of three data bytes per line is recorded thereon. With six horizontal scanning lines and with three bytes per line, a total of 18 bytes representative of the timing signal is recorded on the video cassette 20. The 21st horizontal line contains closed caption data. The video information is then recorded on horizontal scan lines 22 to 262.

The 18 bytes of timing signal comprise the following:
Application No. . . . two bytes
Library No. . . . three bytes
Tape No. . . . two bytes
Field No. . . . three bytes
Field Type . . . one byte
Field Information . . . four bytes
CRC . . . two bytes
PAD or blank . . . one byte The application number is a unique number to identify various categories of applications, such as editing, video juke box and others. The library number is a unique number for identifying various tape libraries. The tape number is a number describing the video cassette 20 which is being recorded as the tape number within the particular library. The field number denotes the number of fields since the beginning of the video cassette 20. The field type represents the field as containing data or video. Finally, the field information contains application specific information about the field.

The process of copying or dubbing the video cassette 14 from the camcorder 12 onto the video cassette 20 in the second VCR 18 continues until all the original video cassettes 14 from the camcorder 12 have been copied onto the video cassettes 20 of the second VCR 18.

Each dub cassette 20 created by this process differs from the source cassette 14 only in that a timing signal has been added to the video cassette 20. However, the apparatus 10 has stored in the memory 42 the pattern of recognition of the 30 fields having the most amount of change as previously described which represents the beginning of the source video cassette 14. Further, within the memory 42 is a first record containing the count of the number of video fields from the beginning of the video cassette 14 in which there was an occurence of sync signals of poor quality. Each video field number, immediately after the sync loss, is stored in a 3-byte location. The first record for loss sync count for each dub cassette 20 has a maximum storage capability of 10 location points. If more than 10 sync loss events are detected on the source cassette 14, the apparatus 10 compares the number of video fields between two consecutive loss sync point and locates the lowest number thereof and removes the field number immediately to the left thereof. The new loss sync point field number is then recorded in the first record. For example, if on a tape, the following loss sync points were detected:

$$F_1 \quad F_2 \quad F_3 \quad F_4 \quad F_5 \quad F_6 \quad F_7 \quad F_8 \quad F_9 \quad F_{10}$$

The apparatus 10 would compare the field count between $F_n$ and $F_{n-1}$ and would find the smallest number and then delete $F_{n-1}$. The new field number immediately after the new loss sync point is then recorded. Thus, in the example shown above, $F_2$ would be deleted and the new first data base would look like the following:

$$F_1 \quad F_2 \quad F_3 \quad F_4 \quad F_5 \quad F_6 \quad F_7 \quad F_8 \quad F_9 \quad F_{10}$$

The old field #$F_3$-$F_{10}$ are then renumbered as $F_2$-$F_9$ respectively, with the field immediately after the newly found loss sync point stored as $F_{10}$.

Finally, at the end of the copying operation of the source cassettee, the user is instructed to insert a new source cassette into the camcorder 12 for copying onto the cassette 20. Multiple "dubs" may be put on a single cassette 20. Each dub, however, will have a record of 62 bytes associated therewith: the 30 bytes which represent the 30 fields with the most amount of change, the two bytes which represent the field number of that group of 30 fields, and the first record of 30 bytes representing the sync loss positions. The plurality of records of 62 bytes are recorded at the end of the video cassette 20.

In addition, the user is then instructed to insert the first data tape into the second VCR 18 and that same information of plurality of records of 62 bytes is recorded onto that data tape.

Edition And Assembling A Video Production

Once the dub tapes have been produced, the user may then use the software loaded in the memory 42 by the apparatus 10 to edit and assemble a video production. The assembling and editing of a video production is done by using the dub video cassettes loaded on the second VCR 18.

For example, if a user now desires to edit and assemble a home movie comprising a compilation of selected video scenes from different portions of the same or different dub cassettes 20 from the same or different libraries, the software in the memory 42 would instruct the microprocessor to perform the task. The microprocessor 40 would generate text through the color graphic and text generator 124, which is displayed on the monitor 30, to instruct the user, through a menu, to select the particular scenes for editing or assembling. Once the user indicates through the remote control unit 32 the choice, the apparatus 10 responds appropriately.

For example, if the user wishes to fast forward to a particular segment of the video cassette 20, the apparatus 10, through the IR generation control 122, and ultimately through the IR emitter 96, generates a signal which is received by the IR detector 26 of the second VCR 18 which causes the second VCR 18 to be in the fast forward mode. If the user then selects to stop and play the video cassette 20 at that location, the user activates the remote control of unit panel 32. This is received by the IR detector 132 of the apparatus 10 which again causes IR emitter 96 to generate the appropriate infrared signal received by the second VCR 18 to stop the fast forward motion thereof and to put the second recorder into the playback mode.

If now the user sees a particular scene on the monitor 30 that is the beginning of a video scene which the user likes to edit, the user activates a control button. This signal is then received by the IR detector 132 which is then received by the custom gate array 44. In this case, the signal is sent onto the high-speed data bus 80 instructing the microprocessor 40 that the user desires to keep track of the location of this particular video scene. The microprocessor 40 now reads the timing signal from the video field which is being displayed on the monitor 30 and records those timing signals in the memory 42 for subsequent retrieval. At the end of the desired video scene, the user again activates the remote controller unit 32. This infrared signal is then received by the IR detector 132 and is interpreted by the custom gate array 44 to instruct the microprocessor 40 that this is the end of the desired video scene. The microprocessor 40 then reads the timing signal from the end of the desired video scene and records that information in the memory 42. In this manner, an entire collection of the desired video scenes with the starting timing signal associated therewith and the ending timing signal associated therewith is stored in the memory 42 in a second data base. This second data base may then be "permanently" stored on the first data tape 20.

Viewing A Video Production

Once the editing and assembling of a video production has been performed by the user, the user may view the edited and assembled video production. This can be accomplished as follows. First, if the apparatus 10 has been turned off since the last step of assembling and editing the video production, the data tape containing the second data base of the desired video scenes must first be "loaded" back into the memory 42. This is accomplished by placing the data tape into the second VCR 18 for playback. Once the second data base, containing the starting timing signal and the ending timing signal of each of the desired video scenes, is stored in the memory 42, the apparatus 10 proceeds by operating on the second VCR 18.

The second VCR 18 has two modes of operation: A fast forward/fast rewind operation and a playback operation. The timing signal recorded on the dub cassette 20 can be read or detected by the second VCR 18 only when the second VCR 18 is in the playback mode. However, since the apparatus 10 knows the operating characteristics of the second VCR 18, based upon the initial software tape, the apparatus 10 will operate the second VCR 18 in the fast forward mode to advance the cassette to near the starting point of the selected video scene. Thus, based upon the operating characteristics which the apparatus 10 has determined from the initial testing of the second VCR 18, the apparatus 10 would cause the second VCR 18 to advance to approximately where the starting field of the first desired video scene would be. The apparatus 10 would then cause the second VCR 18, through the IR emitter 96, to be placed in a playback mode. The video signal is then read back by the microprocessor 40 and the playback continues until the starting field of the desired video scene is reached. At this point, the video cross-point switch 48 is switched such that the video information from the second VCR 18 is passed into the input video terminal 46 and out to the output terminal 52 and to the monitor 30 for viewing by the user. This continues until the end of the timing signal of the desired video scene is reached.

The microprocessor 40 then reads the starting field location of the second desired video scene. If the starting field is on the same tape, the microprocessor 40 would then advance or rewind the second VCR 18 through the IR emitter 96 until the desired starting field of the second video scene is reached. If the starting field of the desired second video scene is not on the tape which is in the second VCR 18, a message would appear on the monitor 30 instructing the user to load the appropriate tape. Whether or not the appropriate tape is in the second VCR 18 can be determined by the microprocessor 40 because associated with the timing signal is information regarding the tape number, as well as the library number—all as previously discussed.

In this manner, each desired video scene is then displayed on the monitor 30.

Producing A Video Production

Once the user has edited and assembled a collection of desired video scene and/or has viewed the collection of the desired video scenes, the user may decide to produce the total video scenes on a single video cassette. This can be accomplished as follows.

First, the user is instructed to insert the original source video cassette with the source video information 14 into the camcorder 12. Since the apparatus 10 is not in control of the camcorder 12, the user is also instructed to rewind the camcorder 12 and then to activate the playback mechanism. Each video field received by the apparatus 10 is then segmented into 24 bits by 24 bits. Thus, each field is divided into 576 bits. The bit pattern of each field is compared to a bit pattern of the previous field. The number of change bits for the comparison is then stored. The last 30 changed field numbers are then totaled. The matching of the playback of the 30 fields to the number of 30 changed fields when the source cassette was first initialized is compared in the following manner:

$$x = \sum_{i=1}^{30} (a_i - b_i)^2$$

where a is the stored field change number and b is the field change number from the video cassette 14.

The minimum value of x in the first 600 fields denotes the starting point of the video cassette 14. Thereafter, each field is counted from this starting position.

As each video field is played back from the camcorder 12, the processor 40 counts the video field of each field detected beginning with the starting position. This count of the video field is compared to the starting field number and ending field number of each of the desired video scene. Further, at the same time, the count of the field number is corrected by the record showing the location of the loss sync signals. Thus, as the signal from the camcorder 12 is played back and if there is no loss sync signal, the current count of the field number is the number counted from the starting position. However, if there is a detection of loss sync signal, the first "good" video field immediately after the loss sync signals is then reassigned the field number, as previously determined from the first record. The current count of the field number is reset to the number from the record showing the location of the loss sync signals.

The video cassette 14 containing the source information is permitted to play until the number of the sync count equals the starting field of the first desired video scene. At that point, the video information that follows is then received by the apparatus 10 through the input terminal 46 and is then recorded onto the second VCR 18 through the output video terminal 52. This continues until the end field of the first desired video scene is reached. At that point, the apparatus 10, through the IR emitter 96, causes the second VCR 18 to be in the stop mode. The video cassette 14 of the camcorder 12 is played back until the starting field of the second desired video scene is reached. When that field is reached, the second VCR 18 is then reactivated in the record mode to receive the video information from the apparatus 10. This process is continued until each collection of desired video scenes is played back from the source original cassette 14 and is recorded onto the production cassette 20 in the second VCR 18.

AUDIO/VIDEO CONTROL BUS

As previously described, the apparatus 10 is in communication with a peripheral apparatus 11 through a digital control bus 106, an audio bus 76, a video bus 50 and a power bus 90. Each of those buses comprises a plurality of lines.

Figure 4:
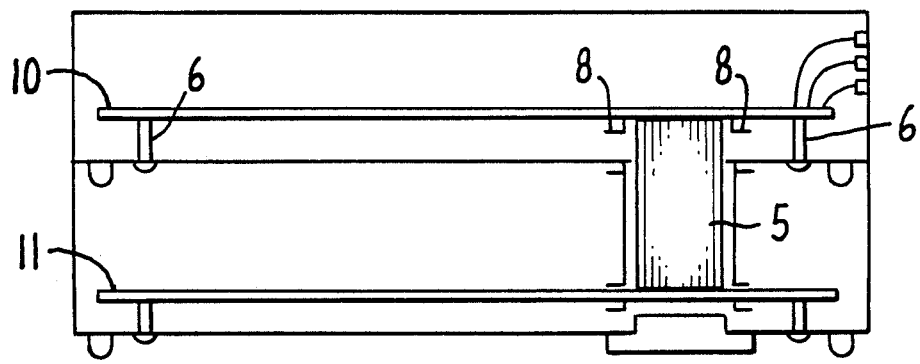
FIG. 4 is a side view of the bus interconnection used in the apparatus of the present invention.

Referring to FIG. 4, there is shown a cross-sectional side view of the mechanical attachment of the apparatus 10 of the present invention to the peripheral apparatus 11. As can be seen in FIG. 4, the apparatus 10 of the present invention comprises a substantially flat printed circuit board on which are mounted the various electronic components of the apparatus 10. The printed circuit board 10 is held onto a casing by a pair of screws 6. On one side of the printed circuit board 10 is a pair of flanges 8. Between the flanges 8 define an opening to which is attached a connector 5. The connector 5 electrically connects the printed circuit board 10 to the printed circuit board 11 of the peripheral apparatus 11. The connector 5 is a part made of elastic material, comprising a plurality of wires running therebetween. When the connector 5 is compressed between the printed circuit boards 10 and 11, and when a particular wire contacts a particular location on the printed circuit board 10 at one end thereof and that same wire contacts another particular location on the printed circuit board 11 at the other end thereof, electrical connection is made between the printed circuit board 10 and the printed circuit board 11. The connector 5 is commercially available from Fuji Rubber Company, Ltd. of Japan. The connector 5 connects all the buses (50, 76, 90 and 106) between the apparatus 10 and 11.

Figure 3:
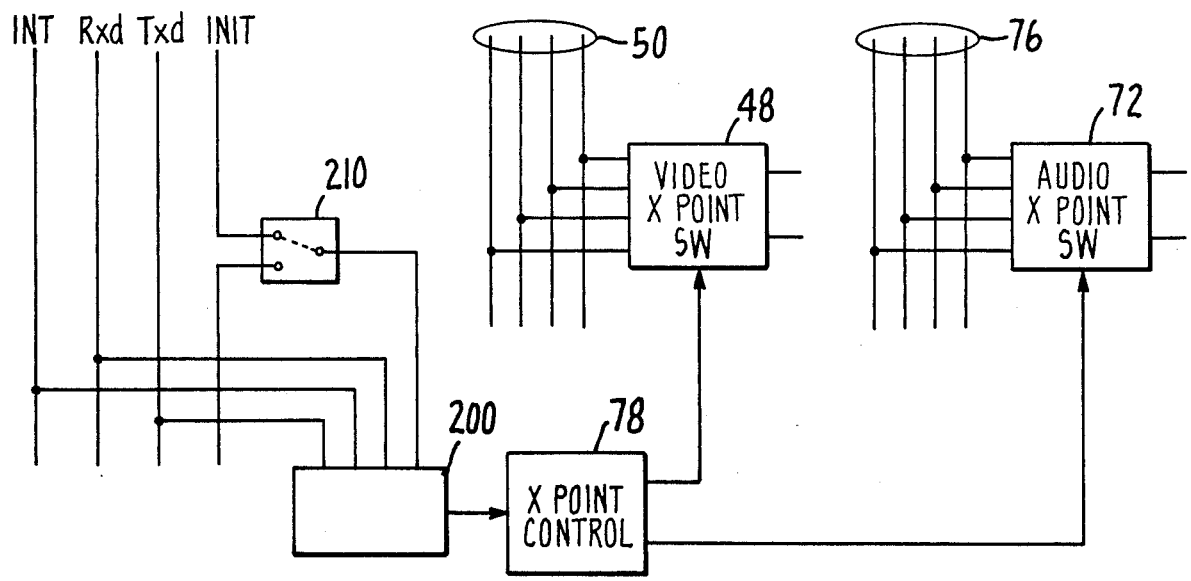
FIG. 3 is a schematic circuit diagram of the audio/video bus controller of the present invention.

The digital control bus 106 comprises four lines. The lines are INIT, TXD, RXD and INT. As previously stated, the video bus 50 comprises four pairs of video lines. In FIG. 3, each pair of video lines is shown as a single line. Finally, the audio bus 76 also comprises four pairs of lines.

The power bus line 90 also comprises a plurality of lines, a switched +14 unregulated volts, a +8 unregulated volts, a +12 regulated volts and a +5 regulated volts.

Within the peripheral apparatus 11, the plurality of video bus lines 50 are supplied to a video crosspoint switch 48 from which two video lines may be selected. Similarly, the plurality of lines comprising the audio bus 76 are supplied to an audio cross-point switch 72 in the peripheral apparatus 11 from which two audio lines may be selected. The video cross-point switch 48 and the audio cross-point switch 72 are controlled by a cross-point register 78.

In the operation of the apparatus 10 to communicate with the peripheral apparatus 11, the microprocessor 40 first sends a signal on the TXD line to all the peripheral apparatuses 11. It should be noted that more than one peripheral apparatus 11 may be connected to the apparatus 10 of the present invention by the same manner of connection. The signal on the TXD line is received by the control unit 200. The control unit 200 sends a signal to switch 210 opening the switch 210. The switch 210 is in series connection on the INIT line from the apparatus 10 to peripheral apparatus 11. When the switch 210 is in the "open" position, the INIT line is connected to the controller 200 and the switch is disconnected from the signal path going to the other peripheral apparatus 11. Thus, a signal sent along the INIT line from the microprocessor 40 would be received by the peripheral apparatus 11 which is closest to it.

In the operation of the peripheral apparatus 11, once all the switches 210 have been opened, the microprocessor 40 sends a signal along the INIT line. The first peripheral apparatus 11 that receives such signal, the controller 200 thereof, causes the switch 210 to close, thereby removing itself from communication with the INIT line but provides the linkage path to subsequent other peripheral apparatus units in serial connection therewith. In addition, the control unit 200 sends a response signal along the RXD line to the processor 40. The signal which was first sent along the INIT line is the number which is assigned to the particular peripheral apparatus 11 which responds to it. The controller 200 stores that number, which is a unique identifying number.

A subsequent signal sent along the INIT line by the microprocessor 40, bearing a different identifying number, would be ignored by the controller 200 of the peripheral apparatus 11 which has had its switch 210 closed. This is because the INIT line would no longer be in communication with the controller 200. However, the next immediate peripheral apparatus 11 in communication with the peripheral apparatus 11 which has its switch 210 open would then respond to it. That unit would then close its switch 210, store the assigned number, and send a response along the RXD line. This process continues until the microprocessor 40 has assigned a number to all of the peripheral apparatus 11. When the microprocessor 40 sends the last signal along the INIT line, and it receives no response to the RXD line, it knows that all the peripheral apparatuses 11 have responded.

Figure 8:
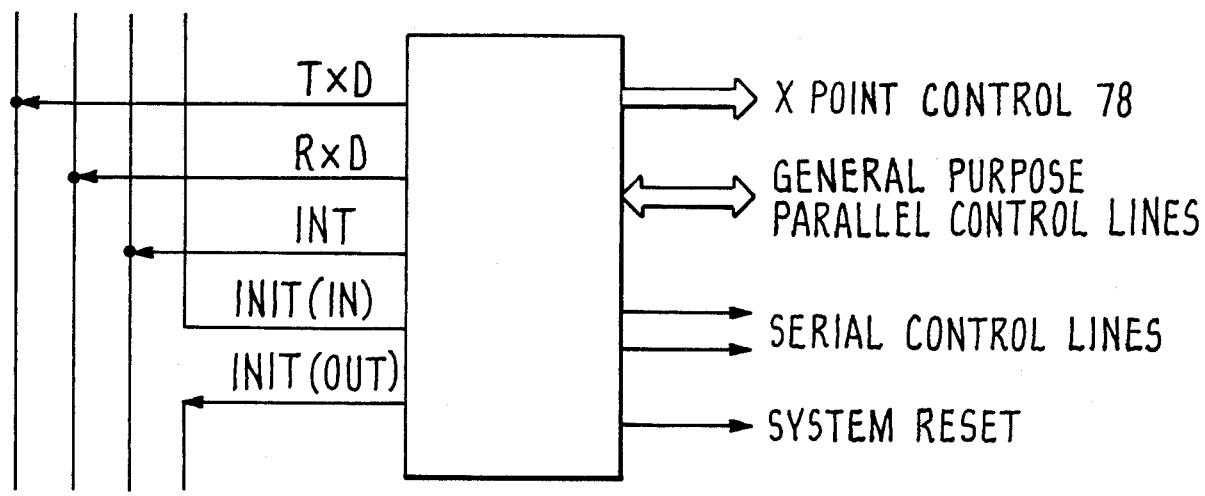
FIG. 8 is a schematic circuit diagram of the controller portion of the peripheral apparatus, in communication with the apparatus of the present invention.

Each of the controller 200 is in communication with the microprocessor 40 along the RXD line and the TXD line. Each of the controller 200 responds in accordance to the unique number which has been assigned to it. A circuit diagram of the controller 200 is shown in FIG. 8. The controller 200 is typically a microcomputer, such as Motorola 6801, containing RAM, ROM, and a microprocessor.

The particular useful application for the peripheral apparatus units 11 includes video tuner, video switcher etc. That is, each of the peripheral apparatus units 11 can respond by switching the video cross-point switch 48 or the audio cross-point switch 72 to seize one or more of the video bus lines 50 and one or more of the audio bus lines 76. In this manner, the microprocessor 40 can cause one or more peripheral apparatus units 11 to be in communication with it or with one another along the video bus 50 and the audio bus 76 through the selection of the appropriate video cross-point switch 48 and the audio cross-point switch 72. Once the peripheral apparatuses 11 are connected to the appropriate audio bus 76 and video bus 50, they can communicate without any further instruction from the apparatus 10.

The relationship between the apparatus 10 and the peripheral units 11 is akin to the master-slave relationship of well-known computer architecture. Further, each peripheral unit 11 can cause a signal to be sent along the INT line which is an interrupt to the microprocessor 40. Once an interrupt to the microprocessor 40 has occurred, the microprocessor can poll each unit by sending a signal along the TXD line and asking each of the peripheral units 11 through its identifying number if it was the unit which caused the interrupt signal.

There are many advantages to the method and apparatus of the present invention. First and foremost is that the invention permits the assembling, editing and production of a production video cassette from a source video cassette which does not have timing signal recorded thereon. Further, the method and apparatus of the present invention permits the assembling, editing and viewing of a video production from one or more video cassettes based upon timing tracks recorded thereon by using the performing characteristics of the cassette recorder which was predetermined. Finally, the present invention permits the communication of a plurality of peripheral apparatus units seizing audio and video analog buses and controlled by a digital control bus.

What is claimed is:

1. A method for assembling, editing and producing a production video cassette from a source video cassette having source video information recorded thereon recorded in a plurality of video fields with each field having a plurality of sync signals, but without any timing signals, indicating the number video fields from a particular location, said method comprising the steps of:

(a) locating the beginning of the video information of said source cassette;

(b) playing back said source video information, while simultaneously
  (i) copying said source video information onto a dub cassette;
  (ii) generating a timing signal on said dub cassette;
  (iii) detecting video information from said source cassette near the beginning thereof and determining the starting point in said source video cassette by noting a number of video fields having a selected amount of change in video information (hereinafter: "a recognizable number of video fields");
  (iv) counting the number of video fields from said recognizable number of video fields and recording said number in said dub cassette;
  (v) detecting the absence of sync signals of each field of video information from said source cassette (hereinafter: "sync signals of poor quality") and noting the location thereof by the count of the number of video fields determined from step (b) (iv);

(c) assembling and editing said dub cassette by tracking the location of desired video scene by the timing signal associated therewith;

(d) rewinding said source cassette; and (e) playing said video information from said source cassette starting from said recognizable number of video fields; while simultaneously
  (i) counting the number of video fields from said recognizable number of video fields;
  (ii) correcting the count of the number of video fields from said recognizable number of fields as determined from step e(i), in the event of detection of occurence of sync signals of poor quality; and
  (iii) copying said video information onto a production cassette, when said number of video fields reaches a level that corresponds to the location of desired video scene.

2. The method of claim 1 wherein said generating a timing signal on said dub cassette further comprises:
recording said timing signal after recording a vertical sync signal on said dub cassette but prior to recording said source video information.

3. The method of claim 2 wherein said timing signal further comprises a signal representative of the identification of the library and of the number of tapes in the library.

4. The method of claim 1 further comprising in step (b), the step of
generating a plurality of sync signals.

5. The method of claim 4 wherein said detecting step of (b)(v) comprises
comparing said generated plurality of sync signals to said plurality of sync signals from said source video information to generate a loss sync signal;
incrementing the count of the number of video fields from said recognizable number of video fields based upon said generated plurality of sync signals, in the event said comparison results in a loss sync signal being generated.

6. The method of claim 5 wherein said detecting step of (b)(v) further comprises
recording the count of the number of video fields from said recognizable number of video fields of the first field immediately after the occurrence of the generation of a loss sync signal.

7. The method of claim 1 wherein said correcting step of (e)(ii) further comprises
reassigning the count of the number of video fields from said recognizable number of fields by the number tracked in step (b)(v).

8. An apparatus for assembling, editing and producing a production video cassette, from a source cassette having source video information recorded thereon, recorded in a plurality of video fields with each field having a plurality of sync signals but without any timing signals indicating the number of video fields from a particular location, said source cassette mounted in a first cassette player having means for playing back said source video information and means for rewinding said source cassette; said apparatus for controlling a second cassette recorder having playback and recording means; said apparatus comprising:
means for receiving said source video information from said source cassette;
means for copying said source video information onto a dub cassette mounted in said second cassette recorder;
means for generating a timing signal on said dub cassette;
means for detecting video information from said source cassette;
means for determining the starting point in said source cassette near the beginning thereof by noting a number of video fields having a selected amount of change in video information (hereinafter: "a recognizable number of video fields");
first means for counting the number of video fields from said recognizable number of video fields in said source cassette;
means for recording said number in said dub cassette;
means for detecting the absence of undetectable sync signals of each field of video information (hereinafter: "sync signals of poor quality");
means for tracking the location of said sync signals of poor quality on said source cassette by the count of the number of video fields determined by the first counting means;
means for assembling and editing said dub cassette by tracking the location of desired video scenes by the timing signals associated therewith;
means for controlling the playback of said source cassette in said first cassette player starting from said recognizable number of video fields;
second means for counting the number of video fields from said recognizable number of video fields;
means for correcting the count of the number of video fields from said recognizable number of fields as determined by the second counting means in the event of the detection of the occurence of sync signals of poor quality; and
means for producing said production cassette by copying the video information from said first cassette player onto a production cassette in said second cassette recorder when said number of video fields reaches a level that corresponds to the location of desired video scene.

9. The apparatus of claim 8 wherein said means for generating a timing signal further comprises means for generating a signal representative of the library and of the number of tapes in the library.

10. The apparatus of claim 8 further comprising means for determining the operational characteristics, such as speed of rewind, speed of fast forward, tolerance of rewind and infrared signals for remote control (hereinafter: "performance characteristics") of said second cassette recorder; and means for controlling said second cassette recorder to playback the desired video scenes based upon the performance characteristics of said second cassette recorder.

11. The apparatus of claim 8 further comprising:
means for generating a plurality of sync signals.

12. The apparatus of claim 8 wherein said detecting means further comprises
means for comparing said plurality of generated sync signals to said plurality of sync signals from said source cassette.

* * * * *